United States Patent
Kuroki

(10) Patent No.: US 8,934,756 B2
(45) Date of Patent: Jan. 13, 2015

(54) REPRODUCING APPARATUS AND CONTROL METHOD THEREOF

(75) Inventor: Daisuke Kuroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 12/716,926

(22) Filed: Mar. 3, 2010

(65) Prior Publication Data

US 2010/0226621 A1  Sep. 9, 2010

(30) Foreign Application Priority Data

Mar. 5, 2009  (JP) .................. 2009-052432

(51) Int. Cl.
| | | |
|---|---|---|
| H04N 9/80 | (2006.01) | |
| H04N 5/775 | (2006.01) | |
| H04N 5/93 | (2006.01) | |
| H04N 5/931 | (2006.01) | |
| G06F 3/00 | (2006.01) | |
| G06F 3/048 | (2013.01) | |
| G11B 11/00 | (2006.01) | |
| G11B 21/08 | (2006.01) | |
| H04N 5/76 | (2006.01) | |
| H04N 21/422 | (2011.01) | |
| H04N 21/4223 | (2011.01) | |
| H04N 21/433 | (2011.01) | |

(Continued)

(52) U.S. Cl.
CPC ........... *H04N 5/76* (2013.01); *H04N 21/42202* (2013.01); *H04N 21/42203* (2013.01); *H04N 21/4223* (2013.01); *H04N 21/4333* (2013.01); *H04N 21/442* (2013.01); *H04N 21/8455* (2013.01)

USPC ........... 386/248; 386/207; 386/230; 386/353; 348/602; 348/603; 369/30.23; 369/53.37; 715/704; 715/708; 715/744; 715/745; 715/811

(58) Field of Classification Search
CPC ........... H04N 5/44; H04N 5/91; H04N 5/765; H04N 9/80; G06F 3/00; G06F 3/028
USPC .............. 386/248, 207, 230, E5.067, E5.069, 386/353, E5.035; 369/30.23, 53.37; 375/E7.278; 348/223.1, 227.1, 602, 348/603, E5.12, E9.051; 715/704, 708, 715/744, 745, 789, 811; G9B/27.019, G9B/27.021, 27.043, 27.05, 27.051
See application file for complete search history.

(56) References Cited

U.S. PATENT DOCUMENTS

| | | | | |
|---|---|---|---|---|
| 5,487,047 | A * | 1/1996 | Oka ............................ | 369/30.23 |
| 6,822,695 | B2 * | 11/2004 | Lee et al. ..................... | 348/603 |
| 7,228,059 | B2 * | 6/2007 | Ushimaru ..................... | 386/207 |

(Continued)

FOREIGN PATENT DOCUMENTS

| | | |
|---|---|---|
| JP | 06-153130 A | 5/1994 |
| JP | 2001-084662 A | 3/2001 |

(Continued)

*Primary Examiner* — Thai Tran
*Assistant Examiner* — Syed Hasan
(74) *Attorney, Agent, or Firm* — Canon USA, Inc., IP Division

(57) ABSTRACT

An image processing apparatus includes a detecting unit configured to detect a change in a viewing environment; a storing unit configured to store position information of data displayed on a display unit when the change in the viewing environment is detected by the detecting unit; and a reproducing unit configured to reproduce data corresponding to the position information stored in the storing unit by receiving a re-viewing instruction.

20 Claims, 6 Drawing Sheets

(51) Int. Cl.
*H04N 21/442* (2011.01)
*H04N 21/845* (2011.01)

(56) References Cited

U.S. PATENT DOCUMENTS

| | | | |
|---|---|---|---|
| 7,356,247 B2 * | 4/2008 | Hamasaka et al. | 386/248 |
| 7,665,035 B2 * | 2/2010 | Burnett | 715/789 |
| 2006/0120692 A1 * | 6/2006 | Fukuta | 386/95 |
| 2009/0148125 A1 * | 6/2009 | Watson et al. | 386/51 |

FOREIGN PATENT DOCUMENTS

| | | | | |
|---|---|---|---|---|
| JP | 2004-096364A | A | 3/2004 | |
| JP | 2004-112311A | A | 4/2004 | |
| JP | 2004112311 | A * | 4/2004 | ............... H04N 5/91 |
| JP | 2005-020057A | A | 1/2005 | |
| JP | 2006-023856A | A | 1/2006 | |
| JP | 2006-180215A | A | 7/2006 | |
| JP | 2006-211061A | A | 8/2006 | |
| JP | 2008-123617A | A | 5/2008 | |

* cited by examiner

FIG. 6

| VIEWING POINT NO. | VIEWING TIME | IMAGE TIME | CAUSE AND LEVEL OF CHANGE IN VIEWING ENVIRONMENT |
|---|---|---|---|
| 1 | 15:12 | 00:12 | LUMINANCE: HIGH |
| 2 | 15:27 | 00:27 | VOLUME: LOW |
| 3 | 15:36 | 00:36 | VOLUME: HIGH |

REPRODUCING APPARATUS AND CONTROL METHOD THEREOF

BACKGROUND OF THE INVENTION

1. Field of the Invention

The present invention relates to a technology for reproducing data corresponding to a point where a viewing environment changes.

2. Description of the Related Art

Recently, television sets and recording equipment including digital versatile discs (DVD), hard disk drives (HDD), and randomly accessible mass storage media such as FLASH memories have been widely used. Combinations thereof form video viewing systems such as theater systems, which are also widely used.

Through such video viewing systems, viewers are capable of easily recording and storing video and easily reproducing the video midway through its sequence. Thus, a flexible video viewing style can be established regardless of the type of video: received video signals such as satellite broadcasting and terrestrial digital broadcasting or stored video data such as video stored on an HDD.

An example is known in which when a viewer needs to run an errand such as answering the door while viewing a television program in real time, recording of the viewed television program on an HDD can be started immediately by pushing a button on a remote controller, and the television program can be viewed later from the point where the recording was started.

Another example is known in which when reproducing of the video stored in an HDD is stopped midway through its sequence and the video stopped midway through its sequence is reproduced after viewing another video, reproducing can be started from the point where the video was stopped without searching for the reproducing start point since the stopped point is stored.

Japanese Patent Laid-Open No. 2001-84662 discloses a technology in which when viewing stored video, the presence of a viewer is monitored, and when the viewer leaves a viewing area, the reproducing of the video is stopped and when the viewer returns to the viewing area, reproducing is started.

Japanese Patent Laid-Open No. 1994-153130 discloses a technology in which a reproducing start point in stored video is determined while extracting a plurality of index images from the video, linking the index images and the recording points, and confirming the index image.

In some cases, it is difficult to satisfactorily view the video because of a change in the surrounding sound and light while viewing the video, i.e., a change in the viewing environment. When it is difficult to satisfactorily view the video, the viewer has to search for the reproducing start point in order to re-view the video.

For example, a case in which a movie is viewed in a dark viewing environment with closed curtains and turned-off lights is considered. If an ambulance drives by, the audio of the movie may be inaudible or difficult to hear. In such a case, the viewer will wait until the siren of the ambulance is no longer audible and re-view the movie from the point where the viewing was interrupted. In another case, if someone mistakenly opens the curtains or turns on the lights, light may reflect off the viewing device, making it difficult to view the movie and interrupting the viewing. In such a case, the viewer will shut the curtains and turn off the lights again and re-view the movie from the point where the viewing was interrupted. In either case, to re-view the movie from the point where the viewing was interrupted, the viewer has the difficulty of searching for and setting the reproducing start point.

When conventional methods are used to cope with the above described issues, it is difficult for the viewer to immediately determine to re-view the movie in response to a change in the viewing environment and carry out operations such as recording and reproducing the movie.

Even when the system disclosed in Japanese Patent Laid-Open No. 2001-84662 is used, an interruption in viewing due to a change in the viewing environment is not avoidable by merely detecting the presence of the viewer. In other words, even when the viewer is in a viewing area, the audio may not be audible due to surrounding noise. Therefore, there is a need to search for and set a reproducing start point.

Moreover, even when the system disclosed in Japanese Patent Laid-Open No. 1994-153130 is used, the index image points do not correspond to changes in the viewing environment. Therefore, while these points may assist the search for a re-viewing point, they do not eliminate the need to search for a reproducing point.

SUMMARY OF THE INVENTION

The present invention eliminates the issues in searching for a reproducing start point when a viewing environment changes.

The image processing apparatus according to the present invention includes a detecting unit configured to detect a change in a viewing environment; a storing unit configured to store position information of data displayed on a display unit when the change in the viewing environment is detected by the detecting unit; and a reproducing unit configured to reproduce data corresponding to the position information stored in the storing unit by receiving a re-viewing instruction.

With the present invention, by storing the position information of the data displayed at the point when a change in the viewing environment is detected and receiving a re-viewing instruction, data corresponding to the stored position information is reproduced. Therefore, according to the present invention, when re-viewing, it is possible to automatically reproduce the data corresponding to the point where the viewing environment changed, and the trouble of searching for a reproducing start point corresponding to where the viewing environment changed can be eliminated.

Further features of the present invention will become apparent from the following description of exemplary embodiments (with reference to the attached drawings).

BRIEF DESCRIPTION OF THE DRAWINGS

FIG. 6 illustrates a table listing information of the viewing points where the viewing environment changed.

DESCRIPTION OF THE EMBODIMENTS

Figure 1:
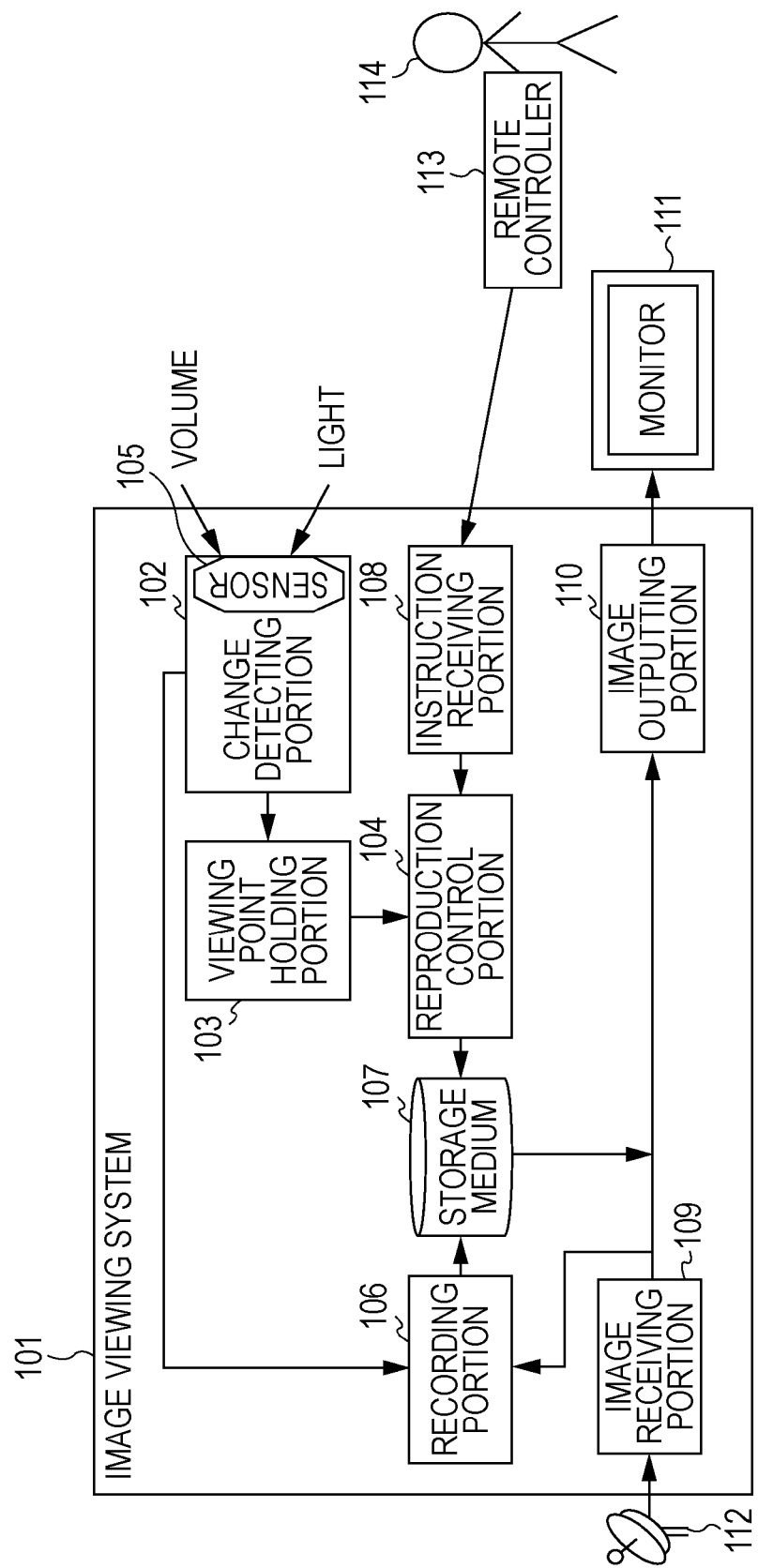
FIG. 1 illustrates the configuration of a video viewing system according to an embodiment of the present invention.

FIG. 1 illustrates the configuration of a video viewing system according to an embodiment of the present invention. Reference numeral 101 represents a video viewing system. The video viewing system 101 includes a change detecting portion 102, a viewing-point storing portion 103, a reproducing control portion 104, a recording portion 106, a storage medium 107, an instruction receiving portion 108, a video receiving portion 109, an antenna 112, and a monitor 111. The video viewing system 101 is configured as an application example of a reproducing apparatus according to the present invention. The change detecting portion 102 is configured as an application example of a detecting unit according to the present invention. The viewing-point storing portion 103 is configured as an application example of a storing unit according to the present invention. The reproducing control portion 104 is configured as an application example of a reproducing unit according to the present invention. The recording portion 106 is configured as an application example of a recording unit according to the present invention.

A sensor 105 is included in the change detecting portion 102 and measures sound and light in a viewing environment. The monitor 111 displays video data. A viewer 114 views the video data displayed on the monitor 111. A remote controller 113 is used by the viewer 114 to send instructions for video selection, volume control, reproducing/stop, and so on to the video viewing system 101.

The instruction receiving portion 108 receives instructions from the remote controller 113. The storage medium 107 is an HDD or a FLASH memory in which video data is stored. The antenna 112 receives signals such as terrestrial digital broadcasting or satellite broadcasting. The video receiving portion 109 retrieves video data from the signals received by the antenna 112. The recording portion 106 controls the recording of the received video data to the storage medium 107. A video outputting portion 110 decodes compressed video data and outputs the decoded video data to the monitor 111.

First, the viewing of video data stored on the storage medium 107 will be described. Upon receiving an instruction from the remote controller 113, the recording portion 106 sends the video data stored on the storage medium 107 to the video outputting portion 110. The video outputting portion 110 decodes the received video data and sends the decoded video data to the monitor 111.

The viewer 114 views the video data displayed on the monitor 111. The sensor 105 constantly measures the sound and light in the viewing environment while the video data is viewed. The change detecting portion 102 monitors changes in the sound and light on the basis of the measurement results of the sensor 105. When a predetermined threshold is exceeded, a change in the viewing environment is detected, and the viewing-point storing portion 103 is notified.

Each time the viewing-point storing portion 103 is notified by the change detecting portion 102, the time of the video data displayed when notified, the time when the video data is viewed, and the cause and level of change in the viewing environment are stored in the viewing-point storing portion 103 as viewing point information.

When the viewer 114 is not able to satisfactorily view the video data because of a change in the viewing environment or because of coping with the change in the viewing environment, and the viewer 114 desires to re-view the video data from the point where the viewing environment changed, a re-view button on the remote controller 113 is pressed. The reproducing control portion 104 receives a re-viewing instruction via the instruction receiving portion 108. As a result, the reproducing control portion 104 searches the viewing point information stored in the viewing-point storing portion 103, uses the most recent viewing point as a reference, sets a point at least zero seconds before the video time of the viewing point used as a reference as a reproducing start point, and sends video data from the storage medium 107 to the video outputting portion 110. Thus, the viewer 114 can quickly reproduce the video data from at least zero seconds before the point where the viewing environment changed.

When the re-view button of the remote controller 113 is pressed multiple times, the reproducing control portion 104 searches the viewing points in the viewing point information stored in the viewing-point storing portion 103 in order from the most recent viewing point to older viewing points for a number of points corresponding to the number of times the re-view button is pressed. In other words, each time the re-view button is pressed, viewing points in the viewing point information stored in the viewing-point storing portion 103 are selected in order from present to past. Then, the reproducing control portion 104 sets a reproducing start point that is at least zero seconds before the video time of the selected viewing point set as a reference. How many second before the reference is to be set as the reproducing start point can be set in advance by the viewer.

Next, an example of receiving signals at the antenna 112 and viewing, in real time, video of soccer or baseball will be described. When the receiving portion 108 receives an instruction from the remote controller 113, signals are received at the antenna 112 and video data is sent to the video outputting portion 110 via the video receiving portion 109. At the same time, the video receiving portion 109 sends the received video data to the recording portion 106, too.

The recording portion 106 continues to temporarily record, i.e., buffer, video data up to a predetermined amount of time before the currently displayed (viewed) video data. Buffering is carried out for a period of at least zero seconds, which is the difference between the reproducing start point used for re-viewing and the video time of the viewing point. When the reproducing start point is set five seconds before the video time of a reference viewing point, the recording portion 106 continues to buffer video up to five second before the current viewing time.

The video outputting portion 110 decodes the received video data and outputs the decoded video data to the monitor 111. The viewer 114 views the video data displayed on the monitor 111. The sensor 105 constantly measures the sound and light in the viewing environment while the viewer 114 views the video data. When the change detecting portion 102 monitors changes in the sound and light through the measurement results of the sensor 105 and detects that a threshold set in advance is exceeded, the change detecting portion 102 detects a change in the viewing environment and notifies the viewing-point storing portion 103 and the recording portion 106.

Each time the viewing-point storing portion 103 is notified by the change detecting portion 102, the time of the video data displayed when notified, the time when the video data is viewed, and the cause and level of change in the viewing environment are stored in the viewing-point storing portion 103 as viewing point information.

When notified by the change detecting portion 102 for the first time, the recording portion 106 records the video data buffered in the recording portion 106 on the storage medium 107 and, at the same time, starts recording video data received after the buffered video data on the storage medium 107.

The re-viewing method is the same as that of storing video. In other words, when the viewer 114 is not able to satisfactorily view the video because of a change in the viewing environment or because of coping with the change in the viewing environment, and the viewer 114 desires to re-view the video data from the point where the viewing environment changed, the re-view button on the remote controller 113 is pressed.

The reproducing control portion 104 receives a re-viewing instruction via the instruction receiving portion 108. As a result, the reproducing control portion 104 uses the most recent viewing point in the viewing point information stored in the viewing-point storing portion 103 as a reference, sets a point at least zero seconds before the video time of the viewing point used as a reference, and sends video data from the storage medium 107 to the video outputting portion 110. Thus, the viewer 114 can quickly reproduce the video data from at least zero seconds before the point where the viewing environment changed.

The recording portion 106 continues to record video data received at the video receiving portion 109 on the storage medium 107 until the viewing ends. Then, when there is no re-viewing request within a predetermined amount of time after the end of viewing, the recording portion 106 detects that the video data recorded on the storage medium 107 will not be re-viewed and deletes the video data from the storage medium 107. The "predetermined amount of time" can be set freely by a viewer to, for example, immediately after the end of viewing, one day, or one week.

Figure 2:
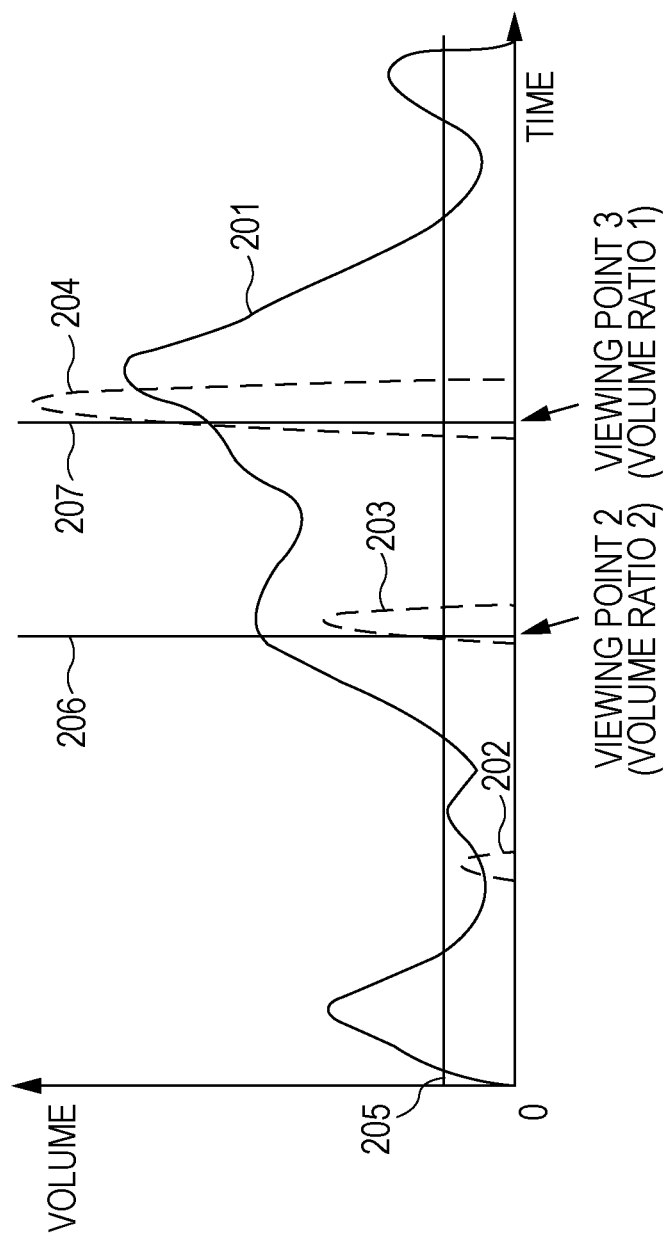
FIG. 2 illustrates the transition of the viewing time of video data and the volume of a viewed video and viewing environment, where the vertical axis represents volume and the horizontal axis represents the time of a viewed video.

Next, with reference to FIG. 2, the process of detecting a change in sound according to this embodiment will be described. FIG. 2 illustrates transition of the volume of the viewed video and viewing environment over the viewing time of the video data, where the vertical axis represents volume and the horizontal axis represents the time of the viewed video.

The volume of the viewed video is represented by reference numeral 201. Reference numerals 202, 203, and 204 represent the volumes in the viewing environment measured by the sensor 105. Reference numeral 205 represents a detection start volume set at the change detecting portion 102. Reference numerals 206 and 207 represent viewing points where the viewing-point storing portion 103 detects changes in the viewing environment.

The change detecting portion 102 detects a change in the viewing environment through the volume ratio of the volume of the viewed video to the volume of the viewing environment. Two thresholds are used for detection: a volume ratio 1 (volume of viewed video=volume of viewing environment) and a volume ratio 2 (volume of viewed video=(volume of viewing environment)×2).

The volume ratio 1 is a threshold for when the volume of the viewed video and the volume of the viewing environment are the same and when the sound of the viewed video is presumed not audible. With the volume ratio 2, the volume of the viewed video is two times as that of the volume of the viewing environment, and the sound of the viewed video is presumed inaudible. The detection start volume 205, which is a minimum volume at the start of detection, is set at the change detecting portion 102 to prevent unnecessary threshold detection to be carried out frequently when the volume of the viewed video and the volume of the viewing environment are respectively small.

Since the volume 202 of the viewing environment does not exceed the detection start volume 205, detection is not carried out. For the volume 203 of the viewing environment, both the volume of the viewed video and the volume of the viewing environment exceed the detection start volume 205, and are larger than and equal to the volume ratio 2 and smaller than or equal to the volume ratio 1. Accordingly, the change detecting portion 102 detects a change in the viewing environment, sends the information of "cause of change: sound" and "level of change: volume ratio 2" to the viewing-point storing portion 103, and sends a notification that there is a change at the viewing point 206. Upon reception of the notification, the information about the viewing point 206 is stored in the viewing-point storing portion 103.

For the volume 204 of the viewing environment, both the volume of the viewed video and the volume of the viewing environment exceed the detection start volume 205 and are larger than or equal to the volume ratio 1. Accordingly, the change detecting portion 102 detects a change in the viewing environment, sends the information of "cause of change: sound" and "level of change: volume ratio 1" to the viewing-point storing portion 103, and sends a notification that there is a change at the viewing point 207. Upon reception of the notification, the information about the viewing point 207 is stored in the viewing-point storing portion 103.

In this embodiment, predetermined volume ratios are used as thresholds compared for change detection. The thresholds, however, may be set on the basis of merely the volume of the viewing environment.

Figure 3:
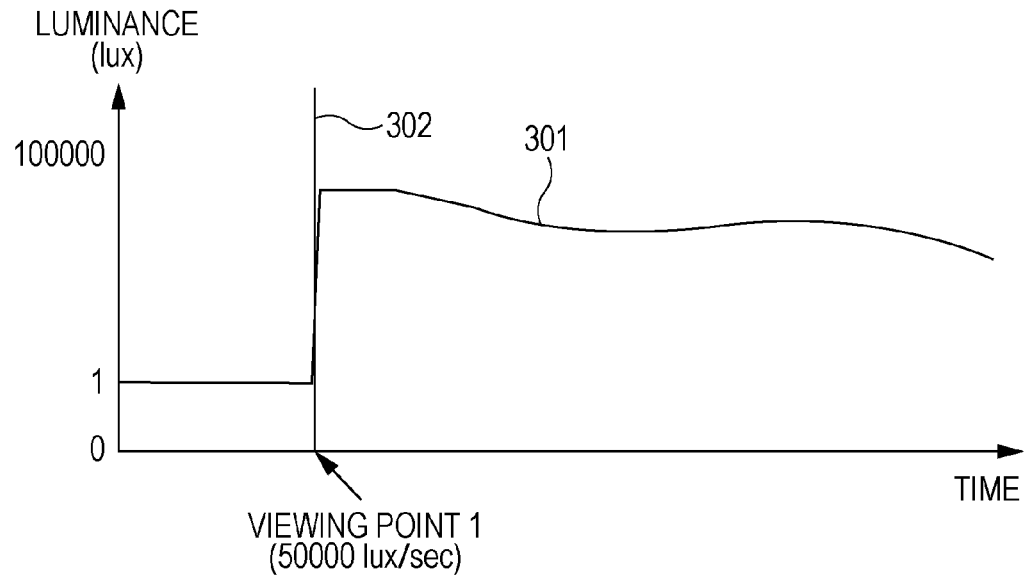
FIG. 3 illustrates the transition of the viewing time of video data and the luminance of the surrounding environment, where the vertical axis represents luminance and the horizontal axis represents the time of a viewed video.

Next, with reference to FIG. 3, a process of detecting a change in light according to this embodiment will be described. FIG. 3 illustrates the transition of the viewing time of the video and the luminance of the surrounding environment, where the vertical axis represents luminance and the horizontal axis represents the time of a viewed video.

Reference numeral 301 represents luminance of the viewing environment measured by the sensor 105. Reference numeral 302 represents a viewing point where the viewing-point storing portion 102 detects a change in the viewing environment.

The change detecting portion 102 detects a change in light according to the amount of change in the luminance (lux) per unit time. Two thresholds 50,000 lux/sec and 100,000 lux/sec are set at the change detecting portion 102 for detection. The change detecting portion 102 constantly monitors the value of luminance 301 in the viewing environment and detects a change in the luminance greater or equal to 50,000 lux/sec and smaller or equal to 100,000 lux/sec at the viewing point 302. Then, the change detecting portion 102 sends the information of "cause of change: luminance" and "level of change: 50,000 lux/sec" to the viewing-point storing portion 103, and sends a notification that there is a change at the viewing point 302. Upon reception of the notification, the information about the viewing point 302 is stored in the viewing-point storing portion 103.

In this embodiment, two thresholds are used in detecting a change in sound and light. One or more threshold may be set.

As described above, in this embodiment, a change in the viewing environment can be detected by flexibly using a plurality of references.

Figure 4:
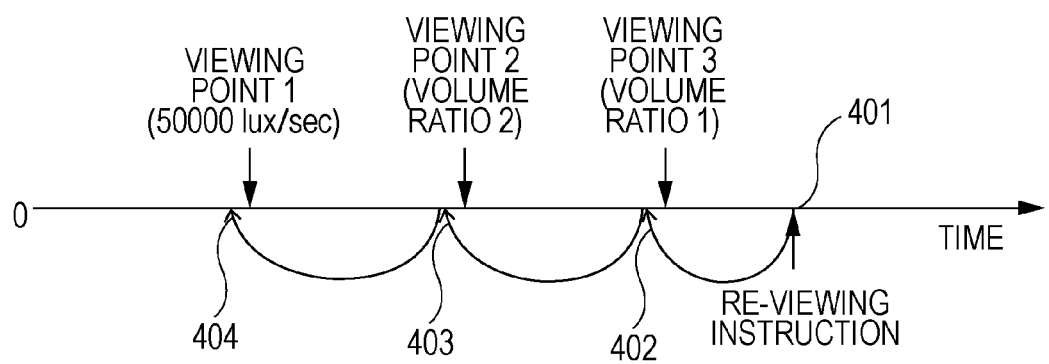
FIG. 4 illustrates the transition of reproducing start points.

Next, transition of the reproducing start point will be described in detail with reference to FIG. 4. The horizontal axis represent the time of the viewed video. Reference numeral 401 represents the time a re-viewing instruction is sent from the viewer. Reference numeral 402 represents a point set as the reproducing start point by one re-viewing instruction. Reference numeral 403 represents a point set as the reproducing start point when two consecutive re-viewing instructions are sent. Reference numeral 404 represents a point set as the reproducing start point when three consecutive re-viewing instructions are sent.

In the examples described with reference to FIGS. 2 and 3, the viewing points 302, 206, and 207 where changes in the viewing environment are detected are registered in the viewing-point storing portion 103 as viewing points 1, 2 and 3, respectively.

For example, the viewer sends one re-viewing instruction at the viewing point 401. In response, the reproducing control portion 104 sets the viewing point 3, which is the most recent viewing point in the viewing point information registered in the viewing-point storing portion 103, as a reference and sets the reproducing start point 402 at a point at least zero seconds before the video time of the reference viewing point.

The viewer sends two consecutive re-viewing instructions at the viewing point 401. In response, the reproducing control portion 104 set the viewing point 2, which is the second recent viewing point in the viewing point information registered in the viewing-point storing portion 103, as a reference and sets the reproducing start point 403 at a point at least zero seconds before the video time of the viewing point of the reference.

The viewer sends three consecutive re-viewing instructions at the viewing point 401. In response, the reproducing control portion 104 set the viewing point 1, which is the third recent viewing point in the viewing point information registered in the viewing-point storing portion 103, as a reference and sets the reproducing start point 404 at a point at least zero seconds before the video time of the viewing point of the reference.

Figure 5:
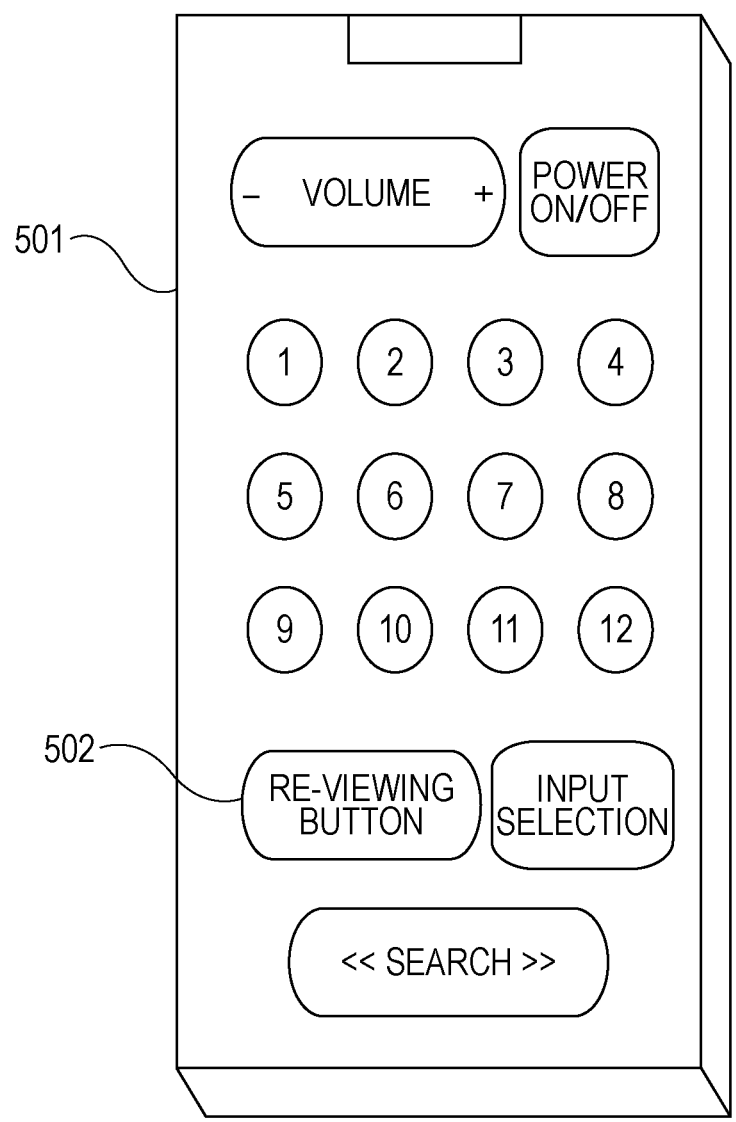
FIG. 5 illustrates the external structure of the remote controller shown in FIG. 1.

FIG. 5 illustrates the external structure of the remote controller 113, which is shown in FIG. 1. A remote controller 501 has a power button, channel buttons, a volume button, and so on. By simply pushing a re-viewing button 502, reproducing is start from the reproducing start point that is at least zero seconds before the video time of the viewing point where the viewing environment changed, as described above.

Here, another method of setting a reproducing start point will be described. FIG. 6 illustrates a table listing information of the viewing points where the viewing environment changed. The table shows serial numbers for viewing points where change in the viewing environment are detected, viewing time, time of the displayed video, and descriptions of the information of the cause and level of change in the viewing environment. The reproducing start point may be set by displaying, to the viewer, the information stored in the viewing-point storing portion 103, which is shown in FIG. 1, in a manner such as that shown in FIG. 6 and by receiving an instruction of the re-viewing point from the viewer. In the table illustrated in FIG. 6, information is represented by characters. Different colors and symbols may be used, however, so that information is displayed in such a way that allows the viewer to intuitively grasp the information. By presenting the viewing points where the viewing environment changed to the viewer, the viewer can select a reproducing start point. The process of displaying the table shown in FIG. 6 is an example process of a presenting unit according to the present invention.

Figure 7:
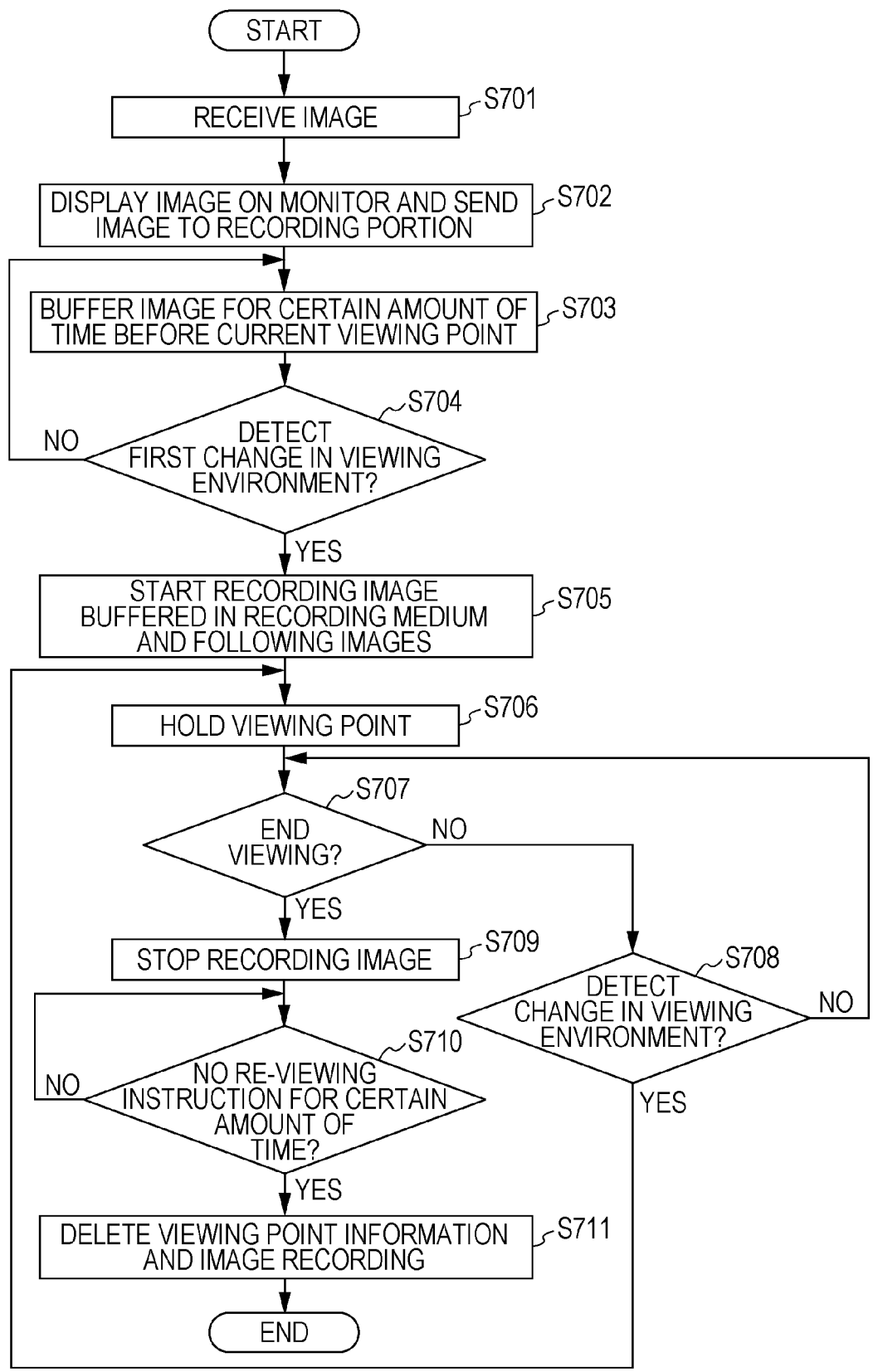
FIG. 7 is a flow chart illustrating the process of a video viewing system receiving signals via an antenna.

Next, a process of displaying video of soccer and baseball in real time by receiving signals via the antenna 112 in the video viewing system 101 will be described with reference to FIG. 7. FIG. 7 is a flow chart illustrating the process of the video viewing system 101 receiving signals via the antenna 112.

First, the video receiving portion 109 receives an instruction from the viewer and starts receiving video data (Step S701).

Subsequently, the video outputting portion 110 displays the video data received at the video receiving portion 109 on the monitor 111, and the video receiving portion 109 sends the received video data to the recording portion 106 (Step S702).

Subsequently, the recording portion 106 buffers the video data up to a predetermined amount of time before the currently viewed video.

Subsequently, the change detecting portion 102 determines whether or not a first change in the viewing environment is detected (Step S704). When a first change in the viewing environment is not detected, the process returns to Step S703. On the other hand, when a first change in the viewing environment is detected, the change detecting portion 102 notifies the recording portion 106, and the process goes to Step S705. The recording portion 106 continues to buffer video data until notified by the change detecting portion 102.

In Step S705, the recording portion 106 stops buffering video data, records the buffered video data on the storage medium 107, and starts recording the video data received subsequently on the storage medium 107. Even when the viewer sends a re-viewing instruction during the process, the video data is continuously received and recorded on the storage medium 107 while displaying on the monitor 111 the video data recorded on the storage medium 107 for re-viewing.

Subsequently, the current time, the video time, and the cause and level of the change in the viewing environment are stored in the viewing-point storing portion 103 (Step S706).

Subsequently, the change detecting portion 102 detects whether or not viewing is ended (Step S707). When the viewing is ended, the process goes to Step S709. When the viewing is not ended, the process goes to Step S708.

In Step S708, the change detecting portion 102 measures the viewing environment and detects a change in the viewing environment. When there is a change in the viewing environment, the process goes to Step S706. When there is no change in the viewing environment, the process goes to Step S707.

In Step S709, the recording portion 106 stops recording video data on the storage medium 107.

Subsequently, the recording portion 106 confirms whether or not a viewing instruction has been send within a predetermined amount of time (Step S710). When a viewing instruction is not sent within a predetermined amount of time, the process goes to Step S711. On the other hand, when a viewing instruction is sent within a predetermined amount of time, the process returns to Step S710.

In Step S711, the viewing-point storing portion 103 deletes the viewing point information related to the respective video data, and the recording portion 106 deletes the video data recorded on the storage medium 107.

By deleting the video data from the storage medium 107 in this way, unwanted video data does not remain on the storage medium when video data is viewed while receiving it in real time, and it is possible to configure a video viewing system with a minimum number of required storage media.

In this embodiment, the change detecting portion 102, which is shown in FIG. 1, uses sound and light as information for detecting a change in the viewing environment. This, however, is not limited thereto.

Furthermore, in this embodiment, the sensor 105, which is shown in FIG. 1, measuring the viewing environment is provided in only one location. However, to carry out detailed measurements of the viewing environment, a plurality of sensors may be provided and may be installed in various locations.

Furthermore, in this embodiment, the time of the displayed video, the time at which the video is viewed, and the cause and level of change in the viewing environment are stored in the viewing-point storing portion 103, which is shown in FIG. 1, as viewing point information.

As described above, in this embodiment, when there is a change in the viewing environment, to store a viewing point and re-viewing the video, the video is reproduced automatically from the point where the viewing environment changed or from the point slightly before the point where the viewing environment changed. Therefore, this embodiment is advantageous in that the trouble of searching for a reproducing start point is eliminated.

In this embodiment, not only when viewing stored video data but also when viewing video data received in real time, the same advantage as described above can be achieved by using a minimum number of required storage media.

In this embodiment, the viewer can set points where the viewing environment changed as reproducing start points by merely carrying out operation for instructing re-viewing.

As described above, in this embodiment, even when the viewer is not able to satisfactorily view video data because of a change in the viewing environment or because of coping with the change, it is possible to quickly reproduce and view the video data from the point where satisfactory viewing was interrupted.

The units and steps that configure the above-described embodiments of the present invention are realized by operating a program stored in a RAM or an ROM of a computer. The program and a computer readable recording medium on which the program is recorded are included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-052432, filed Mar. 5, 2009, which is hereby incorporated by reference herein in its entirety.

What is claimed is:

1. A reproducing apparatus comprising:
    a detecting unit configured to detect, by comparing a volume of sound of environment surrounding the reproducing apparatus to a volume of sound of reproducing data, that information indicating a ratio of the volume of the sound of the environment surrounding the reproducing apparatus to the volume of the sound of the reproducing data satisfies a predetermined condition;
    a storing unit configured to store position information of the reproducing data when the detecting unit detects that the information indicating the ratio of the volume of the sound of the environment to the volume of the sound of the reproducing data satisfies the predetermined condition; and
    a reproducing unit configured to reproduce the reproducing data corresponding to the stored position information which indicates a position before a current reproducing position and indicates the reproducing data having been reproduced when the detecting unit detects that information indicating the ratio of the volume of the sound of the environment to the volume of the sound of the reproducing data satisfies the predetermined condition.

2. The reproducing apparatus according to claim 1, further comprising:
    a recording unit configured to temporarily record data up to a point corresponding to a predetermined amount of time before current data displayed on a display unit,
    wherein, if the detecting unit detects the information indicating the ratio of the volume of the sound of the environment to the volume of the sound of the reproducing data satisfies the predetermined condition, the recording unit records on a storage medium the data temporarily recorded and data subsequent to the data temporarily recorded.

3. The reproducing apparatus according to claim 2, wherein, when the data recorded on the storage medium is not reproduced within a predetermined amount of time, the recording unit deletes the data recorded on the storage medium.

4. The reproducing apparatus according to claim 1, wherein the detecting unit includes a sensor configured to measure the information indicating the ratio of the volume of the sound of the environment and the volume of the sound of the reproducing data satisfies the predetermined condition by comparing a value measured by the sensor and at least one predetermined threshold.

5. The reproducing apparatus according to claim 1, wherein, each time a re-viewing instruction is received, the reproducing unit selects position information from the storing unit in order from present to past and reproduces the reproducing data corresponding to the selected position information.

6. The reproducing apparatus according to claim 1, further comprising:
    a displaying unit configured to display position information stored in the storing unit on a display,
    wherein the reproducing unit reproduces the reproducing data corresponding to position information selected from position information displayed by the displaying unit.

7. The reproducing apparatus according to claim 1,
    wherein the storing unit stores a plurality of pieces of position information of reproducing data, and
    wherein the reproducing unit selects a piece of position information from the plurality of pieces of position information corresponding to the number of times a re-viewing instruction is received and reproduces the reproducing data corresponding to the selected position information.

8. The reproducing apparatus according to claim 1, wherein,
    if the detecting unit detects a plurality of times that the information indicating the ratio of the volume of the sound of the environment surrounding the reproducing apparatus to the volume of the sound of the reproducing data satisfies the predetermined condition and a re-viewing instruction is input during the reproduction of the reproducing data, the reproducing unit reproduces the reproducing data having been reproduced when the most recent detection is executed among the plurality of times of detection.

9. The reproducing apparatus according to claim 1,
    wherein the detecting unit detects that a ratio of the volume of the sound of the environment surrounding the reproducing apparatus to the volume of the sound of the reproducing data exceeds a predetermined ratio,
    wherein the storing unit stores position information of the reproducing data when it is detected that the ratio of the volume of the sound of the environment to the volume of the sound of the reproducing data exceeds the predetermined ratio, and wherein the reproducing unit reproduces the reproducing data corresponding to the stored position information which indicates a position before a current reproducing position and indicates the reproducing data having been reproduced when it is detected that the ratio of the volume of the sound of the environment to the volume of the sound of the reproducing data exceeds the predetermined ratio.

10. A control method of a reproducing apparatus comprising:

detecting, by comparing a volume of sound of the environment surrounding the reproducing apparatus to a volume of sound of reproducing data, that information indicating a ratio of the volume of the sound of environment surrounding the reproducing apparatus to the volume of the sound of reproducing data satisfies a predetermined condition;

storing, in a storing unit, position information of the reproducing data when it is detected that the information indicating the ratio of the volume of the sound of environment to the volume of the sound of the reproducing data satisfies the predetermined condition; and reproducing the reproducing data corresponding to the stored position information which indicates a position before a current reproducing position and indicates the reproducing data having been reproduced when it is detected that information indicating the ratio of the volume of the sound of the environment to the volume of the sound of the reproducing data satisfies the predetermined condition.

11. The control method according to claim 10, further comprising:

selecting a piece of position information from a plurality of pieces of position information stored in the storing unit corresponding to a number of times a re-viewing instruction is received, and, reproducing the reproducing data corresponding to the selected position information.

12. The control method according to claim 10, wherein, if it is detected a plurality of times that the information indicating the ratio of the volume of the sound of the environment surrounding the reproducing apparatus to the volume of the sound of the reproducing data satisfies the predetermined condition and a re-viewing instruction is input during the reproduction of the reproducing data, reproducing the reproducing data having been reproduced when the most recent detection is executed among the plurality of times of detection.

13. The control method according to claim 10, wherein the computer-executable instructions for detecting that a ratio of the sound of the volume of environment surrounding the reproducing apparatus to the volume of the sound of the reproducing data exceeds a predetermined ratio, wherein the computer-executable instructions for storing position information of the reproducing data when it is detected that the ratio of the volume of the sound of the environment to the volume of the sound of the reproducing data exceeds the predetermined ratio, and wherein the computer-executable instructions for reproducing the reproducing data corresponding to the stored position information which indicates a position before a current reproducing position and indicates the reproducing data having been reproduced when it is detected that the ratio of the volume of the sound of the environment to the volume of the sound of the reproducing data exceeds the predetermined ratio.

14. A non-transitory recording medium containing computer-executable instructions to control a reproducing apparatus, the medium comprising:

computer-executable instructions for detecting, by comparing a volume of sound of environment surrounding the reproducing apparatus to a volume of sound of reproducing data, that information indicating a ratio of the volume of the sound of the environment surrounding the reproducing apparatus to the volume of the sound of the reproducing data satisfies a predetermined condition;

computer-executable instructions for storing, in a storing unit, position information of the reproducing data when it is detected that the information indicating the ratio of the volume of the sound of the environment to the volume of the sound of the reproducing data satisfies the predetermined condition; and computer-executable instructions for reproducing the reproducing data corresponding to the stored position information which indicates a position before a current reproducing position and indicates the reproducing data having been reproduced when it is detected that information indicating the ratio of the volume of environment and the volume of reproducing data satisfies the predetermined condition.

15. The non-transitory recording medium according to claim 14, the computer-readable storage medium further comprising:

computer-executable instructions for selecting a piece of position information from a plurality of pieces of position information stored in the storing unit corresponding to a number of times a re-viewing instruction is received; and computer-executable instructions for reproducing the reproducing data corresponding to the selected position information.

16. The computer-readable storage medium according to claim 14, the computer-readable storage medium further comprising:

computer-executable instructions for reproducing, if it is detected a plurality of times that the information indicating the ratio of the volume of the sound of the environment surrounding the reproducing apparatus to the volume of the sound of the reproducing data satisfies a predetermined condition and a re-viewing instruction is input during the reproduction of the reproducing data, the reproducing data having been reproduced when the most recent detection is executed among the plurality of times of detection.

17. The non-transitory recording medium according to claim 14, wherein detecting that a ratio of the volume of the sound of the environment surrounding the reproducing apparatus to the volume of the sound of the reproducing data exceeds a predetermined ratio;

storing position information of the reproducing data when it is detected that the ratio of the volume of the sound of the environment to the volume of the sound of the reproducing data exceeds the predetermined ratio; and reproducing the reproducing data corresponding to the stored position information which indicates a position before a current reproducing position and indicates the reproducing data having been reproduced when it is detected that the ratio of the volume of the sound of the environment to the volume of the sound of the reproducing data exceeds the predetermined ratio.

18. A reproducing apparatus comprising:

a detecting unit configured to detect a change in sound of environment surrounding the reproducing apparatus;

a recording unit configured to temporarily record data up to a predetermined amount of time before current data being reproduced(0033), and record on a storage medium, if the detecting unit detects, by comparing a volume of the sound of the environment surrounding the reproducing apparatus to a volume of sound of reproducing data, that information indicating a ratio of the volume of the sound of the environment surrounding the reproducing apparatus to the volume of reproducing data satisfies a predetermined condition, the data temporarily recorded and data subsequent to the data temporarily recorded;

a storing unit configured to store position information of the reproducing data when the detecting unit detects that information indicating a ratio of the volume of the sound of the environment surrounding the reproducing apparatus to the volume of the sound of the reproducing data satisfies the predetermined condition; and a reproducing unit configured to reproduce the reproducing data corresponding to the stored position information which indicates a position before a current reproducing position and indicates the reproducing data having been reproduced when the detecting unit detects that information indicating the ratio of the volume of the sound of the environment surrounding the reproducing apparatus to the volume of the sound of the reproducing data satisfies the predetermined condition.

19. A control method of a reproducing apparatus comprising:

detecting a change sound of environment surrounding the reproducing apparatus;

temporarily recording data up to a predetermined amount of time before current data being reproduced;

recording on a storage medium, if it is detected, by comparing a volume of the sound of the environment surrounding the reproducing apparatus to a volume of sound of reproducing data, that information indicating a ratio of the volume of the sound of the environment surrounding the reproducing apparatus to the volume of reproducing data satisfies a predetermined condition, the data temporarily recorded and data subsequent to the data temporarily recorded;

storing on a storing unit position information of the reproducing data when it is detected that the information indicating a ratio of the volume of the sound of the environment surrounding the reproducing apparatus to the volume of the sound of the reproducing data satisfies the predetermined condition; and reproducing the reproducing data corresponding to the stored position information which indicates a position before a current reproducing position and indicates the reproducing data having been reproduced when it is detected that the information indicating the ratio of the volume of the sound of the environment surrounding the reproducing apparatus to the volume of the sound of the reproducing data satisfies the predetermined condition.

20. A non-transitory recording medium containing computer-executable instructions to control a reproducing apparatus, the medium comprising:

computer-executable instructions for detecting a change in sound of environment surrounding the reproducing apparatus;

computer-executable instructions for temporarily recording data up to a predetermined amount of time before current data being reproduced;

computer-executable instructions for recording on a storage medium, if it is detected, by comparing a volume of the sound of the environment surrounding the reproducing apparatus to a volume of sound of reproducing data, that information indicating a ratio of the volume of the sound of the environment surrounding the reproducing apparatus to the volume of reproducing data satisfies a predetermined condition, the data temporarily recorded and data subsequent to the data temporarily recorded;

computer-executable instructions for storing on a storing unit position information of the reproducing data when it is detected that information indicating a ratio of the volume of the sound of the environment surrounding the reproducing apparatus to the volume of the sound of the reproducing apparatus and the volume of reproducing data satisfies the predetermined condition; and computer-executable instructions for reproducing the reproducing data corresponding to the stored position information which indicates a position before a current reproducing position and indicates the reproducing data having been reproduced when it is detected that information indicating the ratio of the volume of the sound of the environment surrounding the reproducing apparatus to the volume of the sound of the reproducing data satisfies the predetermined condition.

* * * * *